Dec. 22, 1953   L. G. MILLER   2,663,035
LASTING MACHINE
Filed Dec. 31, 1949   7 Sheets-Sheet 1

Inventor
Lloyd G. Miller
By his Attorney

Inventor
Lloyd G Miller
By his Attorney

Dec. 22, 1953  L. G. MILLER  2,663,035
LASTING MACHINE
Filed Dec. 31, 1949  7 Sheets-Sheet 3

*Inventor*
Lloyd G Miller
By his Attorney

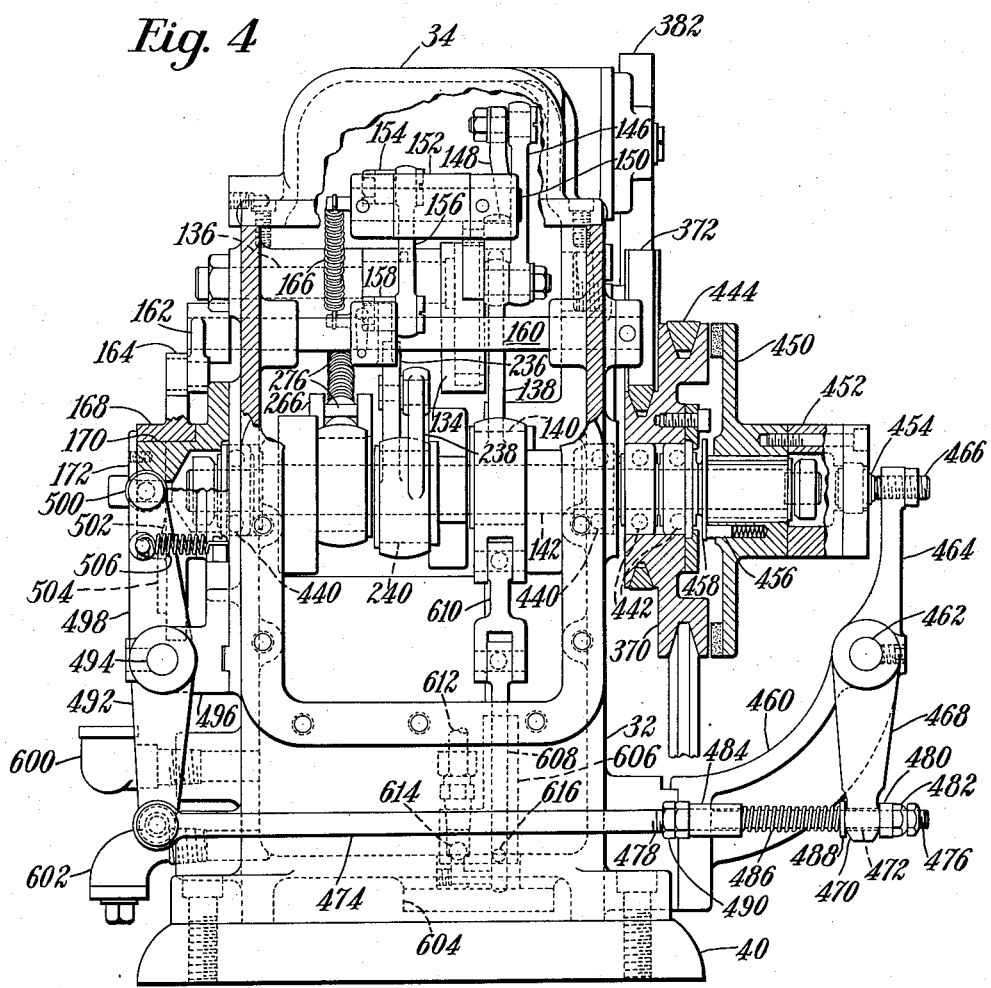

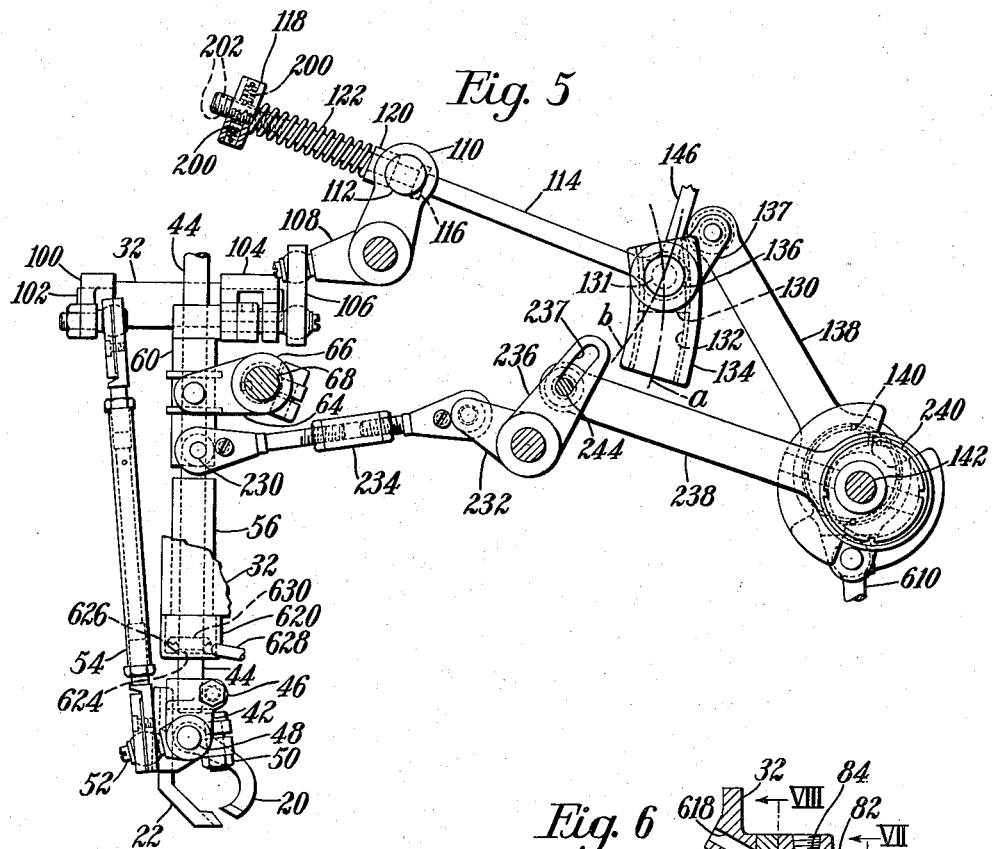
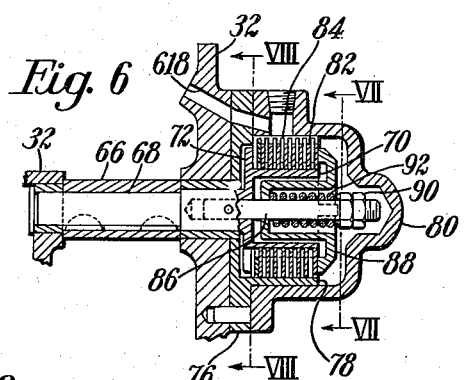
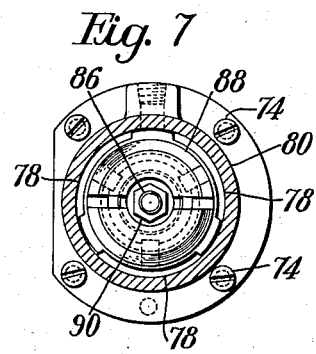
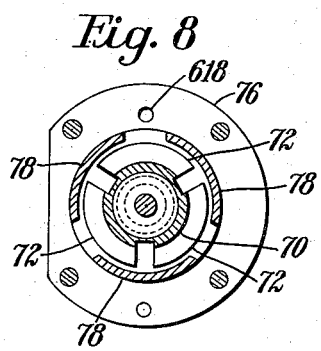
Inventor
Lloyd G. Miller
By his Attorney

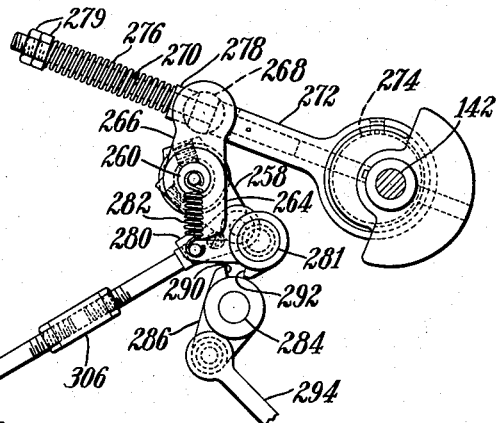
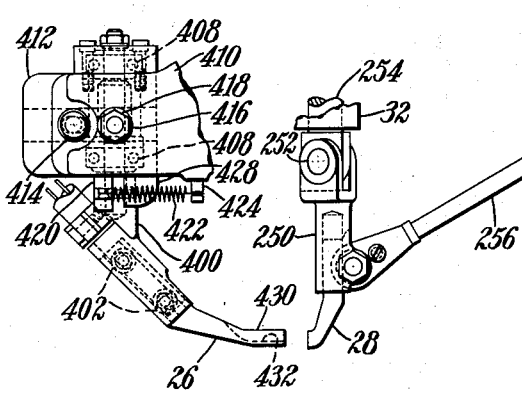
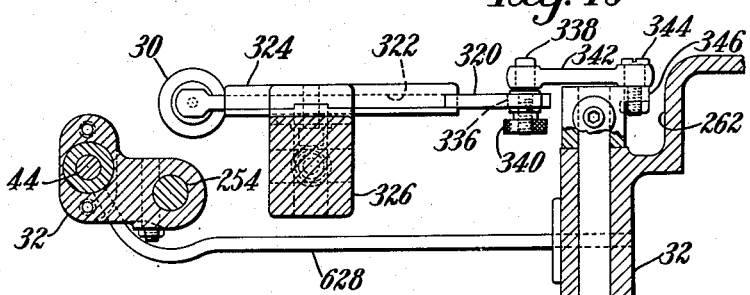
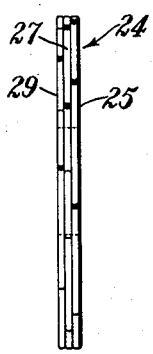
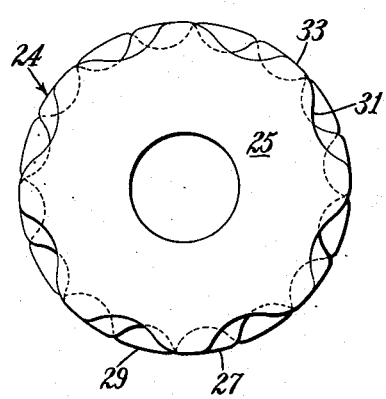
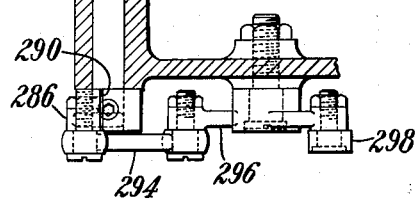

Dec. 22, 1953   L. G. MILLER   2,663,035
LASTING MACHINE
Filed Dec. 31, 1949   7 Sheets-Sheet 7

Inventor
Lloyd G Miller
By his Attorney

Patented Dec. 22, 1953

2,663,035

UNITED STATES PATENT OFFICE 2,663,035

LASTING MACHINE

Lloyd G. Miller, Beverly, Mass., assignor to United
Shoe Machinery Corporation, Flemington, N. J.,
a corporation of New Jersey Application December 31, 1949, Serial No. 136,293

21 Claims. (Cl. 12—8.3)

This invention relates to lasting machines, and particularly to a novel and improved machine of the type in which different portions of the stock to be lasted are tensioned, successively, in different locations along the marginal edge of the bottom of a shoe and the lasting margin of the tensioned stock is, thereafter, laid inwardly over, and pressed against, the bottom of the shoe so as to be secured in lasted position thereto by means of an adhesive which had previously been applied to the inside surface of the lasting margin of the stock and/or the adjacent marginal portion of the shoe bottom. It will be understood, however, that in its broader aspects, this invention is not limited to use in a machine for lasting with an adhesive or to a machine of the exact mechanical construction herein illustrated.

In lasting machines of the type mentioned above, the stock may be tensioned by means of a power-operated gripper, or similar gripping means, which intermittently seizes, tensions and releases different portions of the stock, successively, in different locations along the marginal portion of the bottom of a shoe, as the shoe is fed along either by the operator or by the gripper. With such an arrangement, inasmuch as the stock is fully released by the gripper in each location, before being seized in another location, there is a tendency for the stock, in a succeeding location, to loosen, or even fall back away from the gripper, each time the stock is released, and, during each operation of the gripper, such looseness of the stock, in each succeeding location, must first be taken up before any tensioning stress can be applied thereto. Accordingly, since a considerable portion of the movement of the gripper may thus be ineffective to tension the stock, it has been necessary to provide a rather extensive movement of the gripper in order to assure a proper tensioning of the stock. This not only involves a wasteful motion of the gripper, but results in a slower operating speed of the machine. Also, where the gripper is operated through the action of a spring to apply a yielding pull on the stock, a somewhat uneven tensioning of the stock may result from the varying degrees of looseness thereof at different locations along the marginal edge of the bottom of a shoe.

It is an object of this invention to provide a novel lasting machine in which these difficulties are avoided and substantially the entire movement of the gripper rendered effective for tensioning the stock, in each succeeding location along the marginal edge of the shoe bottom. To this end, and in accordance with a feature of the invention, the herein illustrated machine, which has a power-operated gripper for intermittently seizing, tensioning and releasing different portions of the stock to be lasted, successively, in different locations along the marginal edge of the bottom of a shoe, is also provided with means arranged to engage the lasting margin of the stock and operable, in time relation to the action of the gripper, for holding the stock from loosening, in a succeeding location, each time the stock is released by the gripper. More particularly, the means for holding the stock from loosening comprises a member operable, in time relation to the action of the gripper, to clamp a succeeding portion of the stock against a portion of a shoe-bottom engaging member, or shoe-bottom rest, each time the stock is released by the gripper. With this arrangement, substantially all of the movement of the gripper is effective to apply a tensioning pull to the stock, during each operation of the gripper, and the extent of movement of the gripper required to tension the stock adequately is correspondingly reduced. Moreover, if the gripper is operated by means of a spring, as in the herein illustrated machine, a uniform tensioning pull will be applied to the stock in each succeeding location along the marginal edge of the bottom of the shoe.

In the herein illustrated machine, the lasting margin of the tensioned stock is wiped inwardly over, and pressed against, the bottom of the shoe, by means of a continuously acting rotary wiper, which, preferably, is adapted to impart a rapid series of pressure impulses to the stock, to augment adherence thereof to the shoe bottom, and the gripper is arranged to exert a stress on the stock tending to feed the shoe, intermittently, and thus present the lasting margin of the tensioned stock to the action of this wiper. Thus, the gripper is adapted to seize the stock in a location spaced from the wiper, to move in a direction toward the wiper while tensioning the stock and then to release the stock and return. By clamping the stock against the shoe-bottom rest, before the gripper has released the stock and when the gripper is returning, retrograde movement of the shoe is prevented and the effectiveness of the feeding action of the gripper is greatly increased. To facilitate the action of the rotary wiper, and in accordance with another feature of the invention, the gripper is also arranged to exert a stress on the stock tending to draw the lasting margin of the tensioned stock inwardly over the bottom of the shoe. Accordingly, the lasting margin of the tensioned stock is presented by the gripper in a most favorable position to be engaged by the continuously acting rotary wiper.

The gripper of the herein illustrated machine comprises a pair of jaws which are so operated as first to close on the stock, then to move upwardly in a heightwise direction relatively to the shoe, to tension the stock and, finally, to open, to release the stock, and move downwardly to their original position. The upward movement of the gripper jaws, after they have closed on the stock, is effected through the action of a spring, which is compressed near the conclusion of the upward movement of the gripper, so that a yielding pull is applied to the stock and mechanism is provided for changing the setting of this spring in order to vary the intensity of the pull. At different locations along the marginal edge of the bottom of a shoe being lasted, it may be desirable, in order to accommodate different operating conditions, to vary the extent and also the intensity of the pull that is applied by the gripper. For this purpose, and in accordance with a further feature of the invention, means are provided for increasing or decreasing the upward movement of the gripper jaws, after they have closed on the stock, during the operation of the machine, thus increasing or decreasing the extent of pull and varying the intensity thereof, by causing the spring to be compressed a greater or lesser amount. More particularly, the machine is provided with a treadle that is movable, against the resistance of a relatively light spring, to an initial position for starting the operation of the gripper with a minimum upward movement and this treadle is thereafter movable, against the resistance of another and heavier spring, for increasing the upward movement of the gripper jaws. Thus, by the feel of the treadle, the operator can sense the action of the gripper jaws and vary this action to suit different operating conditions encountered as the lasting operation proceeds.

To facilitate the entry of the stock between the jaws of the gripper, at the beginning of a lasting operation, the gripper-operating mechanism is so arranged that the gripper jaws come to a stop with the jaws opened and in a lowered position, when the control treadle is released. In accordance with another feature of the invention, this control treadle is also arranged to start the operation of the clamping member and to project an edge-guide member to its operative position. More particularly, mechanism is provided for stopping the operation of the clamping member and for holding it in a position away from the shoe-bottom rest and for retracting the edge-guide member from an operative position, when the control treadle is released. With the gripper jaws brought to a stop in a lowered position and opened, the clamping member held away from the shoe-bottom rest, and the edge-guide member retracted from operative position, a shoe may be readily presented to the machine and the lasting margin of the stock to be lasted easily inserted between the opened gripper jaws. Now, the gripper jaws may be set in operation, the clamping member released and started, and the edge-guide member projected to its operative position, all by the initial depression of the control treadle. At the conclusion of a lasting operation, the operator merely releases the treadle and withdraws the shoe from the machine, the gripper jaws being brought to a stop in a lowered position and opened, the clamping member being brought to a stop and held away from the shoe-bottom rest, and the edge-guide member being retracted automatically when the treadle is released.

During the operation of the machine, the shoe is positioned in a heightwise direction and supported against the pull of the gripper jaws by means of the rotary wiper and a member which engages the bottom of the shoe adjacent the marginal edge thereof. This shoe-bottom-engaging member, or shoe-bottom rest, is spaced somewhat, in a direction lengthwise of the shoe, from the rotary wiper, and, in accordance with another feature of this invention, is provided with a portion which extends toward the wiper. This extending portion of the shoe-bottom rest is located directly beneath the gripper jaws as they move toward the wiper, and inwardly from the edge of the shoe bottom, to feed the shoe and to draw the lasting margin of the tensioned stock inwardly over the bottom of the shoe. Thus, this extending portion on the shoe-bottom rest acts as a shield to prevent contact of the lasting margin of the tensioned stock with the bottom of the shoe before the lasting margin is engaged by the rotary wiper. In this manner, premature adherence of the lasting margin to the shoe bottom, which might cause undesirable pleating of the overlasted margin of the stock, is avoided. This shield portion of the shoe-bottom rest also protects the edge of the shoe-bottom member and prevents distortion thereof when the lasting margin of the stock is drawn inwardly over the shoe bottom by the gripper.

The above and other objects and features of the invention will appear in the following detailed description of the preferred embodiment illustrated in the accompanying drawings, and will be pointed out in the claims.

In the drawings,

Fig. 4 is a view in rear elevation of the machine with a rear cover portion removed to show parts within the head casting;

Fig. 5 is a view in side elevation of the mechanism for operating the gripper of the machine shown in Fig. 1;

Figs. 6, 7 and 8 are detail views of a part of the gripper-operating mechanism shown in Fig. 5, Figs 7 and 8 being views in section taken, respectively, on lines VII—VII and VIII—VIII of Fig. 6;

Fig. 9 is a view in side elevation of mechanism for operating a clamping member, or snubber, forming part of the machine shown in Fig. 1 and also illustrating the shoe-bottom rest;

Fig. 10 is a plan view of a portion of the mechanism appearing in Fig. 9 with part of the head casting in section and also showing mechanism for operating the edge guide roll of the machine;

Figs. 15 and 16 are views, in side and end elevation, respectively, of the wiper of the machine.

Figure 1:
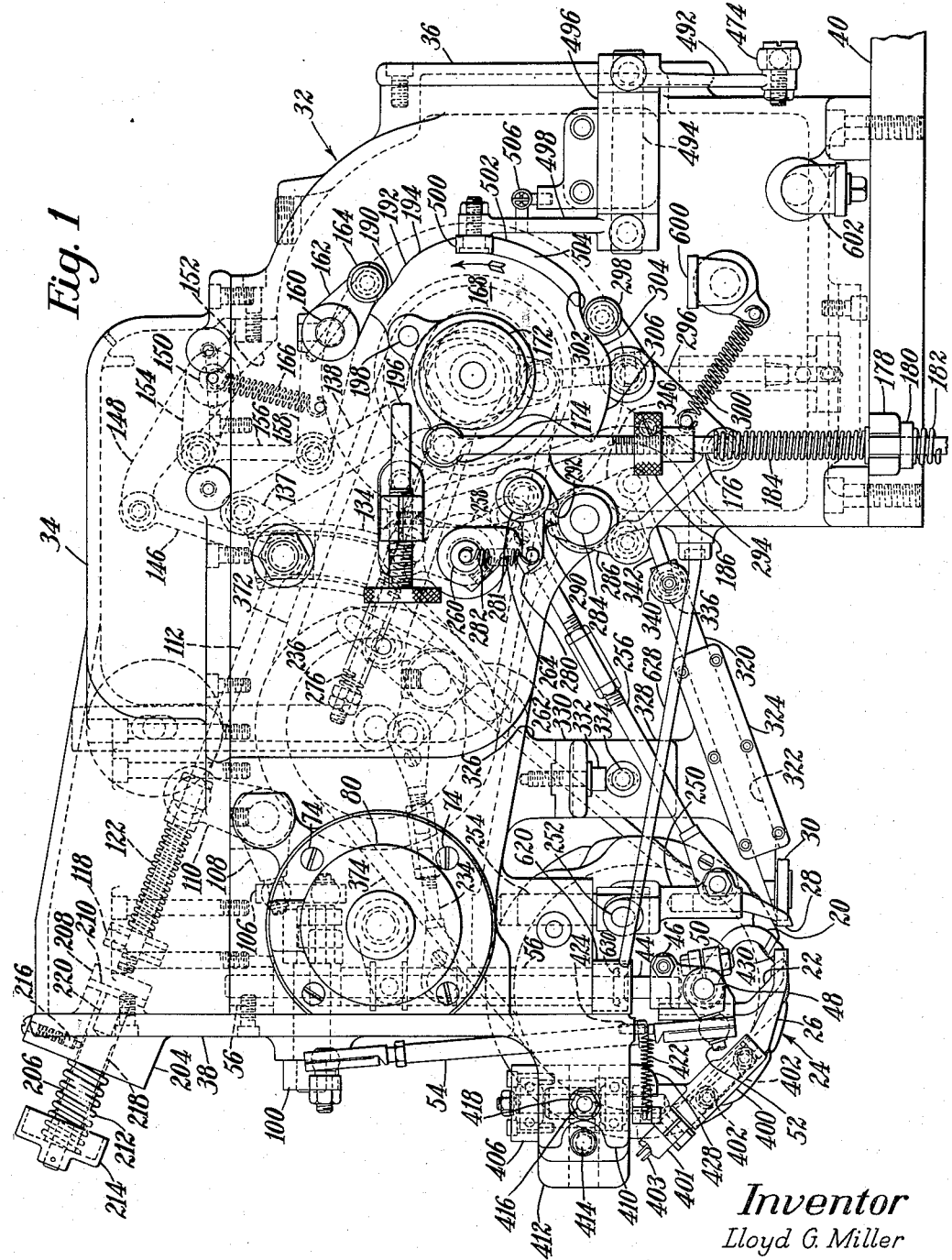
Fig. 1 is a view in side elevation of a machine embodying the features of this invention.

Referring to these drawings, and particularly to Figs. 1, 11–14, the machine illustrated therein is provided with an intermittently operating gripper, comprising jaws 20, 22, for tensioning and overdrawing the stock being lasted and for feeding the shoe, a rotary wiper 24 for wiping the lasting margin of the tensioned stock inwardly over, and for pressing said lasting margin against the bottom of the shoe, and a clamping member, or snubber, 28 for holding the stock from loosening when released by the gripper. During the operation of the machine, the shoe is held in the hands of an operator and positioned relatively to the aforementioned operating elements, in heightwise and widthwise directions, respectively, by means of a shoe-bottom rest 26 and an edge guide roll 30. The aforementioned elements are mounted upon, and operated by mechanism contained within, a hollow head casting 32 which is provided with removable top and rear covers 34 and 36 and which has a detachable front portion 38 (Fig. 1). The head casting is secured to a base 40 which is adapted to be mounted on a suitable support of appropriate height such, for example, as a bench or column, not shown.

The gripper jaws 20 and 22 are carried by a bracket 42 which is secured to the lower end of a shaft 44 by means of a clamp nut 46, Figs. 1 and 5. The jaw 20 extends from a shaft 48 that is journaled for limited angular movement in the bracket 42, and secured to this shaft, by a clamp nut 50, is an arm 52 to which the lower end of a link 54 is connected by means of a ball-and-socket joint. The jaw 22 is rigidly mounted on the bracket 42. The shaft 44 is journaled in suitable bearing bushings 56, 56 carried by a portion of the head casting 32, Figs. 1 and 3, and is arranged for axial movement in these bearings against the resistance of a friction device to be described below. The gripper jaws 20, 22 are opened and closed and elevated and lowered by means of the link 54 and the action of the aforementioned friction device in a manner which will presently appear.

Figure 2:
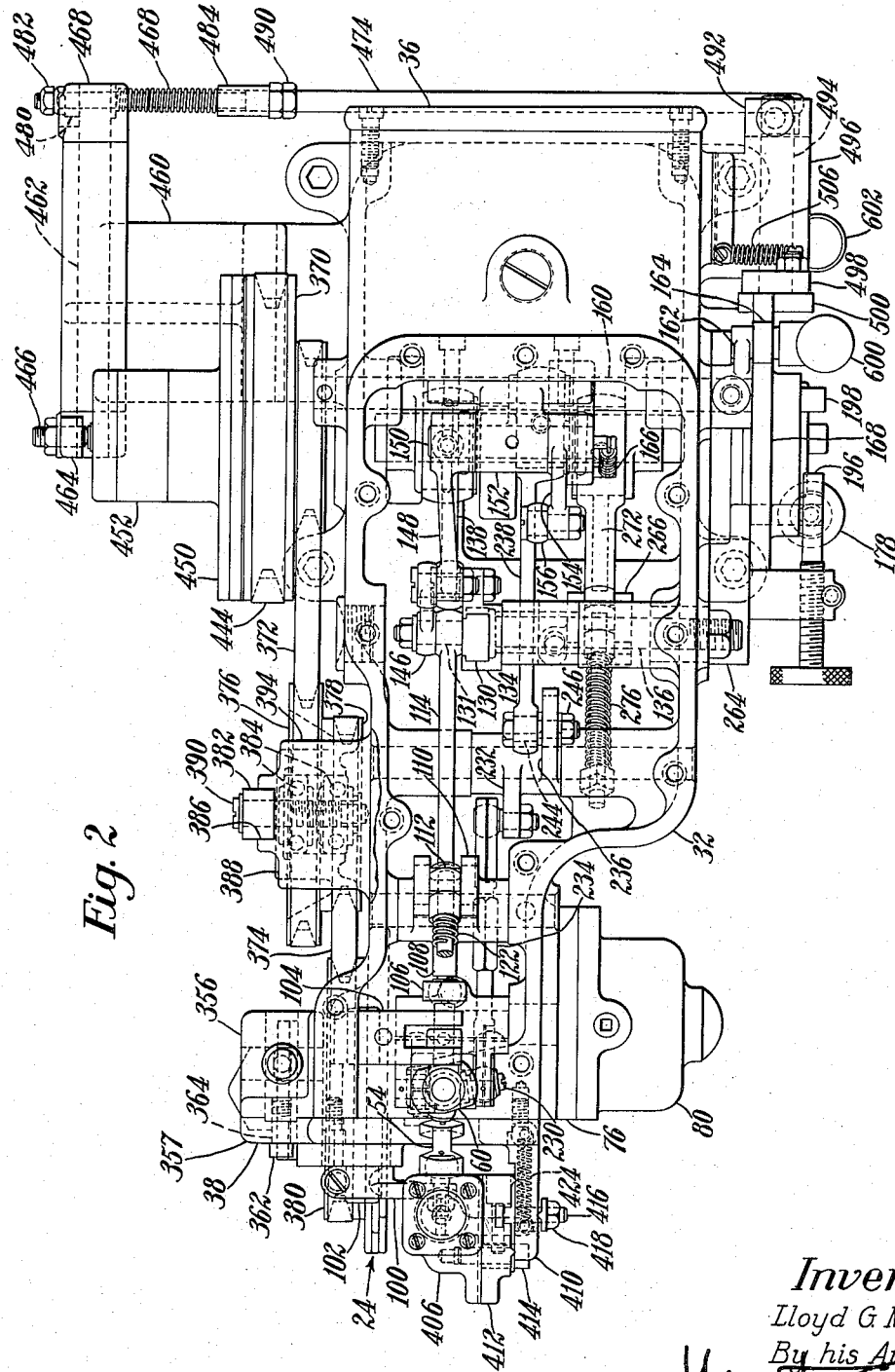
Fig. 2 is a plan view of the machine shown in Fig. 1 with a cover portion of the head casting removed to disclose parts contained therein.
Figure 3:
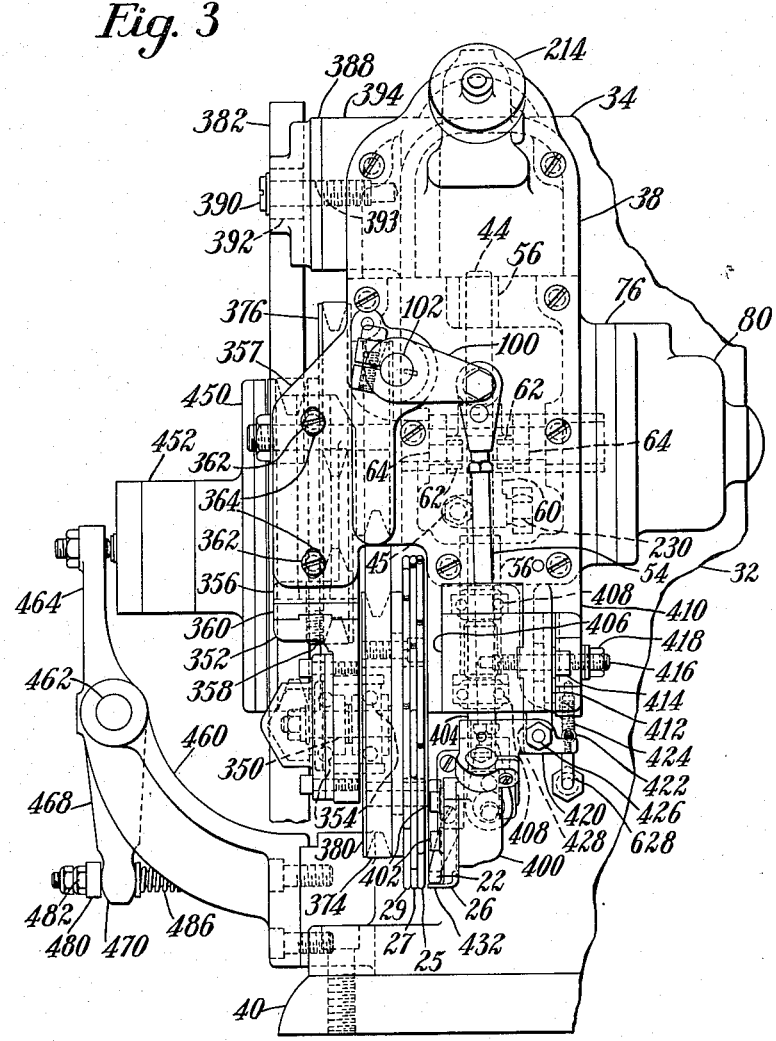
Fig. 3 is a view in front elevation of the machine shown in Fig. 1 with certain parts of the head casting broken away.

Secured to the shaft 44, by means of a clamp nut 45, Fig. 3, is a flanged collar 60 which receives a pair of rollers 62, 62 carried by a pair of arms 64, 64 which are formed integrally with a hub portion 66, Figs. 3 and 5. This hub portion is keyed to a shaft 68 that is journaled in portions of the head casting 32, Fig. 6. The shaft 68 extends beyond the wall of the head casting 32 and is provided with an enlarged hub 70 and radial flange 72. Secured to the head casting by means of screws 74, 74, Figs. 1 and 7, is a plate member 76, having a hub portion 78, and a hollow cap 80, Figs. 1, 2, 3 and 6. Splined on the hub 70 are a plurality of friction plates 82 between which are interposed a plurality of similar friction plates 84 that are splined to the hub portion 78 of the plate 76, Figs. 6, 7 and 8. Pinned to the shaft 68 is a rod 86, which passes through a pressure cup 88, and bearing against this cup and adjusting nuts 90 on the rod 86 is a compression spring 92 which forces the plates 82 and 84 together into frictional engagement. With this arrangement, it will be apparent that axial movement of the shaft 44 in either direction is opposed by the frictional resistance of the plates 82 and 84.

In Figs. 1, 3 and 5, the shaft 44, bracket 42 and gripper jaws 20 and 22 are shown in their lowermost positions and with the jaws 20, 22 opened. When the link 54 is elevated, upward movement of the shaft 44 being resisted by the action of the plates 82, 84, the jaw 20 will be swung toward the jaw 22 until these jaws meet or close on material inserted therebetween. Now, as the link 54 continues to move upwardly, the frictional resistance of the plates 82, 84 will be overcome and the closed jaws 20, 22 will be elevated so as to exert a heightwise pull on the material gripped between them. As will be apparent, the greater the resistance of the material, gripped between the jaws, to heightwise movement, the stronger will be the grip of these jaws on the material. In a like manner, when the link 54 is lowered, at the conclusion of a heightwise pulling action of the gripper jaws, the jaw 20 will first be swung away from the jaw 22, as permitted by the limited angular movement of the shaft 48, and then the shaft 44, together with the opened gripper jaws, will be moved downwardly to the position shown in Figs. 1 and 5. During the operation of the machine, the link 54 is reciprocated rapidly so as to operate the gripper jaws in the manner just explained by means of mechanism which will now be described.

The link 54 is connected, Figs. 1, 2, 3 and 5, at its upper end to an arm 100, which is secured to a shaft 102, journaled in the head casting 32, that carries another arm 104, and a link 106 connects the arm 104 to a bell-crank lever 108 having a bifurcated arm 110, Fig. 5. Passing through a trunnion block 112, mounted in the bifurcated arm 110, is a connecting rod 114 provided with a fixed collar 116, Fig. 5. Threaded on one end of the rod 114 is an adjusting nut 118 and interposed between this adjusting nut and a loose collar 120 is a compression spring 122. As will be apparent, when the rod 114 is reciprocated, the link 54 will also be reciprocated, upward movement of the link being effected yieldingly, through the action of the spring 122, while downward movement of this link is effected positively through the action of the fixed collar 116 on the rod 114. For reciprocating the rod 114 the following arrangement is provided. The rod 114 is connected, by means of a stud 131, Fig. 2, to a block 130 that is slidably mounted in an arcuate guideway 132 formed in an arm 134, Fig. 5. The arm 134 is journaled on a stud 136 carried by the head casting 32, Figs. 2 and 4. Formed integrally with the arm 134 is an upstanding ear 137 and connected to this ear is a link 138 which is mounted on an eccentric 140 carried by a main drive shaft 142, Figs. 4 and 5. When the main shaft 142 is rotated, the arm 134 will be oscillated, about the axis of the stud 136, back and forth between the solid-line position shown in Fig. 5, in which the center line of the guideway 132 coincides with the broken line $a$, and a position in which this center line corresponds to the broken line $b$.

With the block 130 located along the guideway 132 in the position shown in Fig. 5, the axis of the stud 131 on this block is in alinement with the axis of the stud 136 so that the rod 114 will remain stationary during oscillation of the arm 134 by the eccentric 140. However, if the block 130 is moved downwardly, as viewed in Fig. 5, along the guideway 132, the oscillation of the arm 134 will impart reciprocating movements to the rod 114 and hence to the link 54. As will be obvious, the farther the block 134 is moved along the guideway 132 and away from the position shown in Fig. 5, the greater will be the linear extent of the reciprocating movements which are imparted to the rod 114 and, through spring 122, to the link 54. However, inasmuch as these parts are so constructed and arranged that the guideway 132 is concentric with the axis of the trunnion block 112, when the arm 134 is in the position corresponding to the broken line b, the link 54 will always be returned to the same lowermost position regardless of the linear extent of its reciprocating movements. Thus, by shifting the block 130 along the guideway 132 in the arm 134, the extent of upward movement that is imparted to the gripper jaws 20, 22, through spring 122, after they have been closed, may be varied while these jaws are always returned to the same lowermost position as shown in Figs. 1 and 5, when the arm 134 is in a position corresponding to broken line b or when the block 130 is so located along guideway 132 that stud 131 is in alinement with stud 136.

For moving the block 130 along the guideway 132 in the arm 134, a link 146 is also connected to the stud 131, Figs. 1, 2, 4 and 5. This link is also connected to an arm 148, secured to a shaft 150 which is journaled in a bearing block 152 carried by the head casting 32, Figs. 1, 2 and 4. Also secured to the shaft 150 is an arm 154 which is connected, by means of a link 156, to an arm 158 that is carried by a cross shaft 160 journaled in the head casting 32. The cross shaft 160 extends outwardly beyond the wall of the head casting, Figs. 1, 2 and 4, and secured to the outer end thereof is an arm 162 provided with a cam roll 164. A coil spring 166, Fig. 1, is arranged so as to hold the cam roll 164 against the peripheral surface of a multipurpose cam indicated generally by the reference character 168. The cam 168 is journaled on a boss 170, carried by the head casting, and is held in place thereon by means of a thrust washer 172, Fig. 4. Connected to an ear 174 on the cam 168 is a treadle rod 176 that extends downwardly through an apertured ear 178, formed on the base 40, to a treadle, not shown. Secured to the treadle rod, below this ear, is a stop collar 180 for limiting the upward movement of the treadle rod, by means of a relatively light spring 182, to the position shown in Fig. 1. Surrounding the treadle rod and resting on the ear 178, is a relatively heavy spring 184 and threaded on the treadle rod, above this spring, is an adjusting collar 186.

Adjacent to the cam roll 164, the peripheral surface of the cam 168 is formed with a dwell portion 190, a portion of sharp rise 192, and a portion of more gradual rise 194. The adjusting collar 186 is so positioned on the rod 176 that depression of the treadle, against the resistance of spring 182, by an amount sufficient to bring the collar into contact with the spring 184 will rotate the cam 168 to a point where the cam roll 164 will have traveled from the dwell portion 190 up to the top of the sharp rise portion 192. Also as will be explained below, such movement of the treadle will initiate rotation of the main drive shaft 142, start the operation of the clamping member or snubber 28 and project the edge-guide roll 30 to its operative position. With the cam roll 164, thus located at the top of the sharp rise portion 192, the block 130 will be moved along the guideway 132 in the arm 134, to a location where a minimum extent of upward movement will be imparted to the gripper-operating link 54, and hence to the gripper jaws 20, 22 after they have been closed. Further depression of the treadle rod, against the resistance of the heavy spring 184, will cause the roll 164 to travel up the gradual rise portion 194, thus moving the block 130 farther along the guideway 132 and increasing the heightwise movement of the link 54 and gripper jaws 20, 22. An adjustable stop screw 196, mounted on the outside of the head casting 32 in a position to engage a stop pin 198, carried by the cam 168, is provided for limiting the downward movement of the treadle and hence determining the maximum possible extent of heightwise movement of the link 54 and gripper jaws 20, 22. With this arrangement, any increase in the upward movement of the gripper jaws, beyond the minimum distance as determined by the rise 192 on cam 168, must be effected against the resistance of the heavy spring 184 which, of course, increases as this spring is compressed. Hence, an operator will sense the amount of heightwise movement that is being imparted to the gripper jaws at any instant and, therefore, will be able to vary the action of the gripper so as to accommodate different operating conditions encountered in lasting along a shoe.

As has already been explained, upward movement is imparted to the link 54, and hence to the gripper jaws 20, 22 after they have been closed, through the action of the spring 122. In order to facilitate changing the setting of the spring 122, the following arrangement is provided. The nut 118 is rectangular in shape and carries a pair of spring-pressed detents 200 which engage a corresponding pair of grooves 202, 202 cut in the threaded end of the rod 114, Fig. 5. Rotatably mounted in a boss 204, formed on the detachable front portion 38 of the head casting 32, and alined with the rod 114 when the parts are in the positions shown in Fig. 1 and with the treadle released, is a shaft 206. Secured to this shaft, inside of the top cover 34, is a disk 208 which is provided with a rectangular groove 210 of an ample width to receive the nut 118. A coil spring 212, interposed between the boss 204 and a knob 214, secured to the outer end of the shaft 206, normally holds the parts in the positions shown in Fig. 1 and with the disk 208 withdrawn from the nut 118. A spring-pressed detent 216, which always engages one of a plurality of closely spaced serrations 218, formed around the periphery of the shaft 206, tends to maintain the groove 210 in the disk 208 always in register with the nut 118.

When it is desired to vary the setting of the spring 122, the shaft 206, which is counterbored at 220 so as to receive the end of the rod 114, is pushed inwardly, against the resistance of the spring 212, by means of the knob 214 until the groove 210 on the disk 208 is in engagement with the nut 118. Now, the shaft 206 may be rotated in the desired direction to increase or decrease the tension of the spring 122 by turning the adjusting nut 118. When the desired setting has been obtained, the knob 14 is released and the shaft 206 and disk 208 are withdrawn by spring 212. However, the detent 216 will now engage one of the serrations 218 and thus hold the shaft 206 in position with the groove 210 of the disk 208 in register with the nut 118. The setting of the spring 122 will determine the intensity of the pull which will be applied to the stock when the gripper jaws are moved upwardly for a minimum distance. By increasing the upward movement of the gripper jaws, in the manner explained above, the extent of pull will, of course, be increased, and also spring 122 will be compressed to a greater extent so that the intensity of the pull is correspondingly increased.

In addition to their heightwise tensioning movements, the gripper jaws 20, 22 are also moved in directions extending lengthwise and laterally of a shoe being lasted for the purpose of imparting stresses to the stock gripped between the gripper jaws tending to feed the shoe and to draw the lasting margin of the stock inwardly over the bottom of the shoe. To this end, the gripper jaws are mounted on the bracket 42 in offset relation to the axis of the shaft 44, indicated in Fig. 11 by the point $x$, and the shaft 44 is oscillated through a small angle in time relation to the opening and closing and heightwise movements of the gripper jaws. For thus oscillating the shaft 44, the following mechanism is provided. The collar 60, which is secured to the shaft 44, carries a radially extending stud 230, Figs. 2 and 3, and this stud is connected to a bell-crank lever 232 by means of a link 234, Fig. 5. One arm 236 of this bell-crank lever is provided with an arcuate slot 237. One end of the link 238, extending from an eccentric 240 on the main drive shaft 142, is adjustably secured to the arm 236 by means of a stud 244, passing through the slot 237, and a clamp nut 246, Fig. 2. When the main shaft is rotating, the shaft 44 will be oscillated by the eccentric 240 once during each vertical reciprocation of the link 54 and gripper jaws 20, 22. As will be pointed out below, the angular relationship of the eccentrics 140 and 240 is such that the gripper jaws 20, 22 are moved along an arcuate path, about the axis of the shaft 44 and in a direction toward the wiper 24, while these jaws are closed on the lasting margin of the stock and these jaws are then returned along the same path after they have opened to release the stock. By loosening the clamp nut 246, the position of the stud 244, along the slot 237 from the position shown in Fig. 5, may be varied.

Figure 11:
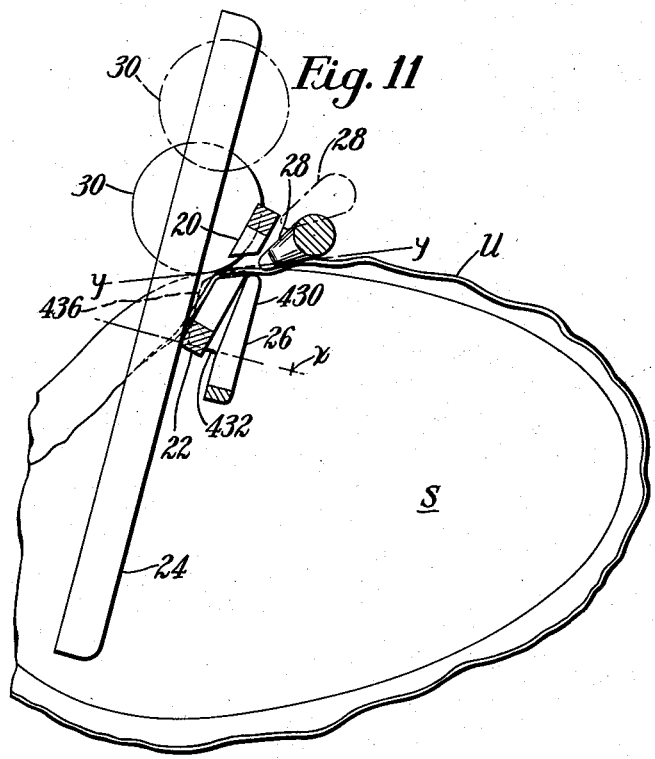
Figs. 11, 12, 13 and 14 are schematic plan views of the operating elements of the machine illustrating the different positions assumed by these elements during a complete operating cycle.
Figure 12:
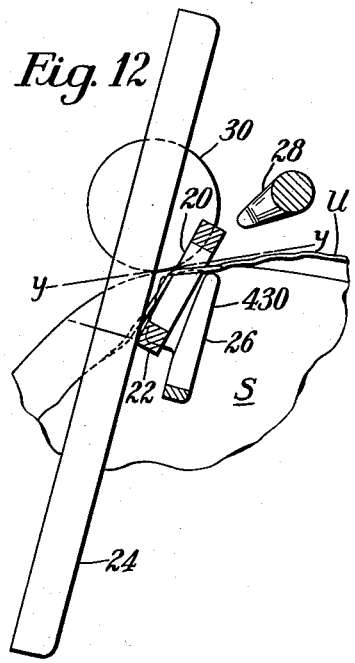

As will be obvious, inasmuch as the throw of the eccentric 240 is constant, such repositioning of the stud 244 will decrease the angular extent of the oscillations of the shaft 44 by a greater or lesser amount depending on how far the stud is moved outwardly in the slot. With the parts in the positions as shown in Fig. 5, the jaws 20, 22 will have completed their movement along the arcuate path toward the wiper. During the next 180° rotation of the shaft 142 and eccentric 240, the gripper jaws will be returned to what may be considered as a starting position and as shown in Fig. 11. At this point in the cycle of operation of the machine, the arm 236 will be in a position where the slot 237 is concentric with the axis of the eccentric 240. Therefore, increasing or decreasing the angular extent of the oscillations of the shaft 44, in the manner set forth above, will not change the starting position of the gripper jaws but, instead, will merely increase or decrease the extent of movement of the gripper jaws away from that starting position and toward the wiper. As will be apparent, this changing of the angular extent of oscillation of the shaft 44 is a setting-up adjustment which must be made with the top cover portion 34 removed.

The clamping member, or snubber, 28 is operated to clamp the lasting margin of the stock being lasted against a portion of the shoe-bottom rest 26 and thus prevent loosening of the stock when the gripper jaws 20, 22 are opened and returning to starting position, in the following manner. The clamping member, or snubber, is secured to the lower end of an arm 250 which is pivotally mounted, by means of a pin 252, on a stud 254 that is fixed in a lower part of the head casting 32, Figs. 1 and 9. A link 256 is connected, at one end, to the arm 250 and, at its other end, to an arm 258 that is secured to a shaft 260, journaled in opposite side portions of the head casting 32. The head casting is formed on one side with a recess, the outline of which is indicated by the reference character 262 in Fig. 1, and the arm 258 is located on the outside of the head casting in this recess. At the other side of the head casting, a second arm 264 is secured to the shaft 260 while, inside of the head casting, a third bifurcated arm 266 is also secured to this shaft, Figs. 2 and 9. Journaled on the bifurcated arm 266 is a trunnion block 268 through which a rod 270 passes. This rod is pinned to a link 272, extending from an eccentric 274 that is carried by the main drive shaft 142, Fig. 9. A compression spring 276, surrounding the rod 270, is interposed between a thrust collar 278, which bears against the trunnion block 268, and a pair of lock nuts 279, threaded onto the end of the rod 270.

When the main shaft 142 is rotated, the eccentric 274 will tend to oscillate the arm 266, shaft 260 and arms 258 and 264, yieldingly in one direction, through the action of the spring 276, and positively in the other direction by the thrust of the link 272 against the block 268, so that the snubber 228 will be swung toward and away from the shoe-bottom rest 26. Such oscillation of the shaft 260, and the arms 258, 266 and 264, is at times prevented, and the action of the eccentric 274 absorbed by the spring 276, by means of a latch member 280 that is pivoted on a stud 281, mounted on the outside of the head casting 32, and held in engagement with the arm 264 by means of a coil spring 282, Figs. 1 and 9. For swinging the latch member 280 away from the arm 264, thus to release the shaft 260 for oscillation by the eccentric 274, the following mechanism is provided. Journaled in a lower portion of the head casting 32 is a shaft 284, Figs. 1 and 10, to one end of which is secured a lever arm 286 that is provided with a lug 290. The lug 290 is in alinement with a similar lug 292, formed on the hub portion of the latch member 280. A link 294 connects the lever arm 286 with another lever 296 which is pivotally mounted on the outside of the head casting 32, Fig. 1. On one end of this lever is a cam roll 298 that is held against the peripheral surface of the cam 168 by means of a spring 300. Adjacent to the roll 298, the peripheral surface of the cam 168 is shaped to provide a dwell portion 302, a rise portion 304, and a dwell portion 306. These cam portions are so arranged that the rotation of the cam 168, which results from the initial depression of the treadle rod 176 to a point where the adjusting nut 186 comes into contact with the spring 184, will cause the roll 298 to ride up the rise portion 304 to the dwell portion 306 and the arm 286 to rotate, in a clockwise direction, far enough to swing the latch member 280 downwardly out of engagement with the arm 264 by means of the lugs 290 and 292. During any further movement of the treadle, the roll will ride over the dwell portion 306.

The movement which is imparted to the snubber 28 is somewhat greater than is necessary to bring the snubber into engagement with the bottom rest 26. Accordingly, a certain portion of the action of the eccentric 274 is absorbed by the spring 276, even when the arm 264 is released by the latch member 280. In order that the amount of such lost motion may be varied, and the length of time during which the snubber is effective to clamp the stock against the bottom rest correspondingly changed, the link 256 is formed in two parts which are connected together by means of a turnbuckle 306. It will be apparent, inasmuch as the throw of the eccentric 274 is constant, that by lengthening or shortening the link 256, by means of this turnbuckle, the effective period of action of the snubber may be varied at will. Also, the intensity of the clamping action of the snubber may be adjusted by changing the setting of the spring 276 by means of the lock nuts 279. As will be apparent, the spring 276 will yield to accommodate stock of different thicknesses.

The edge guide roll 30, which is preferably formed of yieldable material, such as rubber, so as to be conformable to the marginal portion of the bottom of a shoe, is rotatably mounted on the lower end of a bar 320 that is slidably mounted in an inclined guideway 322 formed in a bracket member 324, Figs. 1 and 10. This bracket member is secured to a boss 326, extending downwardly from the lower side of the head casting 32, by means of a second bracket 328, spacer block 330 and screws 332, 334, Fig. 1. These parts are provided with matching tongues and grooves and elongated holes for the screws 332, 334 so that adjustment of the bracket member 324 in three directions, at right angles, may be effected when these screws are loosened. At its upper end, the bar 320 is slotted at 336 and a stud 338, which passes through this slot, is secured to this end of the bar by means of a clamp nut 340. A link 342 is connected to the stud 338 and also to a stud 344 which is carried by an arm 346, Fig. 10. The arm 346 is secured to the shaft 284, on the opposite end of this shaft from the arm 296, and is located in the recess 262 formed in the head casting 32. Accordingly, when the shaft 284 is rotated, as a result of the initial depresssion of the treadle rod 176, the edge guide roll 30 will be projected downwardly and forwardly from the retracted position, shown in Figs. 1 and 10 and by broken lines in Fig. 11, to its operating position as shown in solid lines in Figs. 11–14. The exact location of the edge guide roll, when in its operating position, may be varied by loosening the clamp nut 340.

The rotary wiper 24 is provided with a shaft 350 which is rotatably mounted in the lower end of a bracket 352 by means of suitable anti-friction bearings 354, Fig. 3. In Figs. 11–14 the wiper 24 has been illustrated as being formed out of a solid disk, in order to avoid confusion. However, as is shown more clearly in Figs. 15 and 16, this wiper is actually made up of three disks 25, 27 and 29. The periphery of each of these three disks is cut away to provide a plurality of openings 31 and intervening lands 33, and the three disks are assembled together with these peripheral openings and lands angularly offset as shown in Fig. 15. The bracket 352 in turn is secured to a second bracket 356 by means of a screw 358 and a filler block 360. The opposed surfaces of these two brackets and the filler block are provided with matching tongues and grooves so that adjustment of the wiper 24 in two horizontal directions, at right angles, is permitted when screw 358 is loosened. The bracket 356 is secured to a laterally extending part 357 of the front portion 38 of the head casting 32 by means of screws 362 which pass through slots 364 formed in the part 357, Figs. 2 and 3. By loosening the screws 362, the wiper 24 may be adjusted in a vertical direction. The wiper 24 is driven at a relatively high speed from a main drive pulley 370 by means of belts 372, 374, a pair of idler pulleys 376, 378 and a pulley 380 which is secured to the wiper, Fig. 2. The idler pulleys 376, 378 are rotatably mounted on the lower end of a bar 382 by means of anti-friction bearings 384. This bar is slidable in a groove 386 formed in a circular block 388. A clamp screw 390, passing through a slot 392 in the bar 382 and through a hole 393 in the block 388, secures the bar and the block against the face of a boss 394 which extends laterally from the top cover portion 34 of the head casting, Fig. 3. This arrangement makes it possible to maintain a proper tension in the belts 372, 374 after adjustment of the position of the wiper, inasmuch as with the clamp screw 390 loosened, the idler pulleys 376, 378 may be moved vertically or toward or away from the pulley 370 or 380 in a manner which will be apparent. The flexibility of the belt 374 is sufficient to accommodate all lateral adjustments of the wiper.

The shoe-bottom rest 26 is secured to the side of a holder 400, by means of screws 402, and this holder has an upwardly extending shaft 404 that is journaled in a bearing block 406 by means of anti-friction bearings 408, Figs. 3 and 9. This bearing block is adjustably secured to a web 410, which extends forwardly from the lower part of the removable front portion 38 of the head casting 32, by means of a tongue-and-groove filler piece 412, a clamp screw 414 and a clamp bolt 416 and nut 418, Figs. 1, 2, 3 and 9. When the clamp screw 414 is loosened, the bearing block 406 may be adjusted toward or away from the head casting 32 while, with the nut 418 loosened, the bearing block may be adjusted in a heightwise direction. Formed on the holder 400 is a laterally extending arm 420 and a coil spring 422 is stretched between this arm and a pin 424 carried by the front portion 38 of the head casting. This spring tends to rotate the holder 400 in a direction to swing the shoe-bottom rest toward the side of the wiper 24. For limiting the extent of swinging movement of the shoe-bottom rest in this direction, and thus adjust the position of the shoe-bottom rest relatively to the wiper, the arm 420 carries an adjustable stop screw 426, Fig. 3, which engages a lug 428 on the web portion 410. The operating end of the shoe-bottom rest is formed with an upstanding rib 430 and a horizontally extending flange, or shield portion, 432 of the shape shown more clearly in Figs. 11–14. The front edge 434 of this flange is arcuate in shape, Fig. 13, while its side edge 436 is straight and substantially parallel to the plane of the side face of the wiper 24, Fig. 11. By adjusting the stop screw 426, the shoe-bottom rest may be positioned with the side edge 436 of its flange 432 closer to or farther away from the plane of the side face of the wiper. The shoe-bottom rest holder 400 is bored to receive an electrical heating unit 401, Fig. 1, which is connected by leads 403, to a suitable source of electrical energy, not shown, for heating the bottom rest 26.

Referring particularly to Fig. 4, the main drive shaft 142 is rotatably mounted in the side portions of the head casting 32 by means of anti-friction bearings 440 and the main drive pulley 370 is rotatably supported on the shaft 142 by means of anti-friction bearings 442. The pulley 370 has two faces and is driven from a motor, not shown, by means of a belt 444. For connecting the main drive shaft to the pulley 370, the following arrangement is provided. Beyond the pulley 370, a clutch member 450 is splined on the end of the shaft 142. Secured to this clutch member is a thrust sleeve 452 provided with a rotatable thrust button 454. A spring-pressed plunger 456, carried by the clutch member 450 and bearing against a flange 458 on the shaft 142, normally urges the clutch member to the right, Fig. 4, and out of engagement with the side face of the pulley 370. Secured to the lower portion of the head casting is an outwardly and upwardly extending bracket 460 in which is journaled a rockshaft 462. Mounted on one end of this shaft is an arm 464 provided with an adjustable thrust screw 466 in alinement with the thrust button 454. A second arm 468, mounted on the opposite end of the shaft 462, is provided with a rounded end portion 470 in which there is a bore 472. Passing through the bore 472 is a rod 474 having a threaded end 476 and an intermediate threaded portion 478 of slightly larger diameter. A thrust washer 480 and stop nut 482 are assembled on the threaded end 476 of the rod 474, at one end of the arm 468, while a bushing 484, coil spring 486 and a thrust washer 488 are assembled on this rod and interposed between an adjusting nut 490 and the other side of the arm 468. One end of the rod 474 is connected to an arm 492 that is secured to one end of a rockshaft 494. This rockshaft is journaled in a bracket 496, mounted on the side of the head casting, and secured to the opposite end of this shaft is an arm 498 carrying a cam roll 500, Figs. 2 and 4.

The cam 168 is provided, on its side face, with a cam track having a rise portion 502 and a dwell portion 504, Fig. 4. A coil spring 506 is arranged to hold the cam roll 500 against the side of the cam 168 with the parts in the position shown in Fig. 4. However, when the cam 168 is rotated, during the initial depression of the treadle rod 176 to a point where the adjusting nut 186 engages the spring 184, the cam roll 500 will ride up the rise portion 502 and onto the dwell portion 504. The rod 474 will now be shifted to the right, Fig. 4, and the clutch member 450 moved into engagement with the pulley 370, yieldingly by the action of the spring 486, so that the main shaft is driven from the pulley 370. During any further depression of the treadle rod 176, for the purpose of increasing the vertical movement of the gripper jaws, the cam roll 500 will ride along the dwell portion 504 without changing the setting of the clutch member 450. Thus the initial depression of the treadle rod not only releases the snubber 28 and projects the guide roll 30 to operative position, but also starts the rotation of the main shaft and sets the gripper jaws and the snubber into operation. When the treadle rod is released, for return to the position shown in Fig. 1, by spring 182, the main shaft will rotate sufficiently, under its own momentum, to restore the parts to the positions shown in that figure and with the latch 288 in engagement with the arm 264 to hold the snubber away from the shoe-bottom rest. Also the block 130 will be elevated, by spring 166, to the position shown in Fig. 5. Accordingly, the gripper jaws 20, 22 will come to rest in their lowermost position and opened so as to facilitate the entry of the lasting margin of the stock therebetween at the beginning of another lasting operation.

The head casting 32 is hollow to form a reservoir for lubricating oil and is provided with a filling spout 600 and drain 602, Figs. 1, 2 and 4. Communicating with a well 604, in the lower part of the head casting, is a pump cylinder 606 in which there is a pump plunger 608, Fig. 4. This plunger is connected to the eccentric 140 by means of a link 610 and the pump cylinder is provided with a discharge pipe 612 and suitable check valves 614, 616. When the main shaft 142 is rotated oil is pumped from the reservoir and discharged through the pipe 612. This pipe, shown broken off in Fig. 4, actually extends into the upper portion of the head casting where it is arranged to spray lubricating oil over the various operating parts contained within the head casting, this oil eventually flowing back to the lower portion of the head casting to be recirculated by the pump in a well-known manner. A port 618 is provided in a side wall of the head casting 32 to lead lubricating oil to the friction plates 82, 84, see Fig. 6. In order to prevent leakage of the lubricating oil downwardly along the shaft 44, where this shaft projects through the lower wall of the head casting, the following arrangement is provided. A hollow cup 620 is fitted on over the shaft 44 and secured to the head casting, Fig. 5. The shaft 44 passes through a hole 624 in the cup and adjacent to this hole there is an upwardly extending flange 626. A discharge pipe 628 is connected to the cup adjacent to this flange and secured to the shaft is an oil thrower 630. Oil traveling down the shaft 44 will be thrown off, by the thrower 630, into the annular space between the flange 626 and the inside of the cup 620 from which space the oil will drain back into the oil reservoir through the discharge pipe 628.

The machine which has been described above operates as follows. When in use, the drive motor is turned on so that the pulley 370 and the rotary wiper 24 are driven continuously. To begin a lasting operation, the operator takes a shoe, for example, comprising an upper U and a sole member S, assembled on a last in the usual manner, and presents it, bottom-side up, to the machine with the sole member held up against the bottom rest 26 and with the lasting margin of the upper stock inserted between the open gripper jaws 20, 22, Fig. 11. Before the treadle rod 176 is depressed, the edge-guide roll 30 will be retracted, upwardly and rearwardly, to the dotted-line position and the snubber 28 will be held away from the shoe-bottom rest by the action of the latch member 280, as shown in Fig. 11. Also, the gripper jaws will be in their lowermost position and opened. Upon depression of the treadle rod, the edge-guide roll will be projected, downwardly and forwardly, to its operative position, shown in full lines in Fig. 11, the snubber will be released, and the gripper jaws set into operation.

At the beginning of a cycle of operation of the machine, the gripper jaws 20, 22 will be opened and the lasting margin of the stock U will be clamped against the front portion of the rib 430, on the shoe-bottom rest 26, by the snubber 28, as shown in Fig. 11. During the next part of the operating cycle, the gripper jaws will be closed by movement of the jaw 20 toward the jaw 22, the closed gripper jaws will begin their heightwise tensioning movement and the snubber 28 will move away from the shoe-bottom rest, thus releasing the stock to the action of the gripper jaws, Fig. 12. During this initial tensioning movement of the gripper jaws, the stock will be broken away from the edge of the sole member S if it has become adhered thereto. Next, the gripper jaws, while continuing their tensioning action, will be swung toward the plane of the side face of the wiper 24, in an arcuate path about the axis of the shaft 44, which is indicated by the point $x$ in Fig. 11, so as to exert a stress on the lasting margin of the stock tending to feed the shoe and to present the lasting margin of the tensioned stock to the action of the rotary wiper. Also, because of the relationship between the arcuate path of movement of the gripper jaws and the edge of the bottom of the shoe, the shoe being guided against the edge guide roll 30 in such a manner that a tangent to the edge of the shoe bottom, at the point of operation of the gripper jaws, see broken line $y$—$y$, is inclined to the plane of the wiper, as shown in Figs. 11-14, the gripper jaws will exert a component of stress tending to draw the lasting margin of the stock inwardly over the bottom of the shoe.

Figure 13:
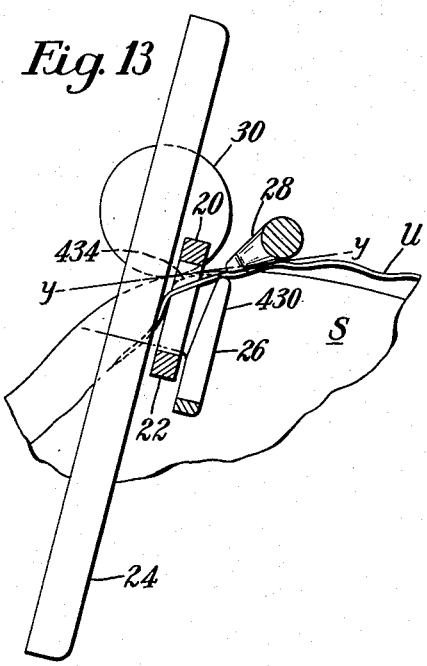
Figure 14:
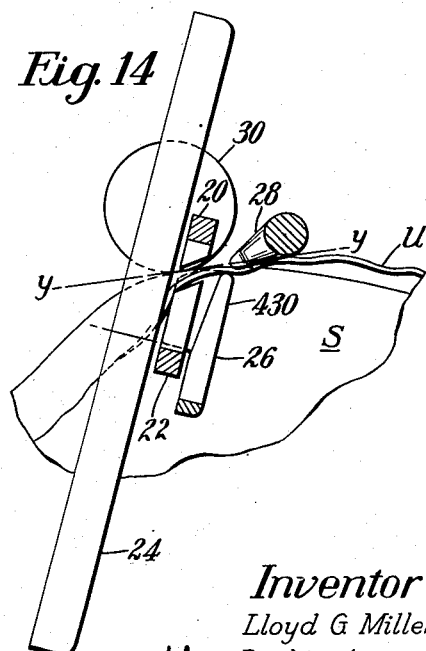

Just as the swinging movement of the gripper jaws toward the plane of the side face of the wiper is completed, but before these jaws are opened to release the stock, the snubber 28 will clamp the lasting margin of the stock against the shoe-bottom rest, Fig. 13. The gripper jaws will now be opened, Fig. 14, and returned to their starting position to complete the operating cycle, during which time the upper stock will be clamped against the shoe-bottom rest by the snubber 28. This operating cycle is repeated as the lasting operation proceeds along the edge of the shoe bottom and the lasting margin of the tensioned stock will be wiped inwardly from the edge of, and pressed against the bottom of, the shoe by the continuously acting rotary wiper 24. It will be understood that, before presenting a shoe to the machine, the inside surface of the lasting margin of the stock U and/or the adjacent surface of the sole member S will have been coated with a suitable adhesive so that the lasting margin will be secured in lasted position on the sole member by the action of the wiper. At the conclusion of the lasting operation, the treadle rod 176 is released to bring the gripper jaws to a stop, to withdraw the edge guide roll, and to hold the snubber away from the shoe-bottom rest. If desired, the operator may then move the shoe along a short distance, or swing it around, by hand to present the remaining portion of the lasting margin of the stock to the action of the rotary wiper and thus complete the lasting operation. The elevated position assumed by the edge guide roll, when retracted, provides ample clearance space for such manipulation of the shoe.

During a lasting operation, the operator may increase the heightwise movement of the gripper jaws by depressing the treadle rod 176 against the action of the spring 184. Such an increased movement of the gripper jaws, while they are closed, may be desirable when lasting in different locations along a shoe where a longer and harder pull is required, while, at other locations, a lesser heightwise movement of the gripper jaws may be sufficient. By manipulating the treadle rod, the proper amount of heightwise movement of the gripper jaws may be instantly obtained as the lasting operation proceeds along the shoe. Also, when the treadle rod is fully released, the action of the gripper is stopped, with the jaws in their lowermost position and opened, the snubber is stopped and held in a retracted position, and the edge guide roll is withdrawn from operative position, so that the entry of the work into, and withdrawal from, the machine, is greatly facilitated.

The effectiveness of the gripper jaws to tension the stock is enhanced to a very considerable extent by the action of the snubber 28. It will be appreciated that the tension which is applied by the gripper jaws to the upper stock will extend somewhat beyond the portion of the stock that is actually seized by these jaws. For example, at the conclusion of a tensioning, feeding, and overdrawing action of the gripper jaws, although these jaws will have moved toward the plane of the side face of the wiper and away from the rib 430 on the shoe-bottom rest, there will be some degree of tension remaining in the next succeeding portion of the stock that is located just in front of the rib. By causing the snubber to clamp this portion of the upper stock against the rib on the shoe-bottom rest, Fig. 13, and to hold the stock against loosening in this location while the gripper jaws are opened and returning, and until the gripper jaws again close on the lasting margin of the stock in location closely adjacent to the rib, Fig. 11, substantially all of the heightwise movement of the gripper jaws will be rendered effective for applying a tensioning pull to the stock.

In adjusting the spring 122, through which upward movement is imparted to the gripper jaws, it is so set that, with the particular type of material being lasted, this spring will yield, just before the gripper jaws complete their upward movement, when the treadle rod is depressed to provide for a minimum upward movement of these jaws. Since, due to the action of the snubber, the gripper jaws seize stock, in each succeeding location, in which some tension has been retained, a uniform tensioning pull, as determined by the setting of the spring, will be applied to the stock in each succeeding location. However, when a portion of the shoe is reached where not only a longer but also a stronger pull is required to tension the stock properly, the treadle rod may be depressed to increase the upward movement of the gripper jaws by a greater or lesser amount. Now, the gripper jaws will be moved upwardly to a greater extent and the spring 122 through which this movement is effected will be compressed by a greater amount so as to increase the intensity of the pull which is applied to the stock. Thus, by holding the stock from loosening, in each succeeding location, it is not only possible to obtain a very uniform tensioning action which can be varied to accommodate different materials, but this tensioning action can be increased, both as to the extent and intensity, by increasing the upward movement of the gripper jaws. Yet, by holding the stock from loosening by means of the snubber, this uniform and variable tensioning is obtained with a minimum amount of heightwise movement of the gripper jaws which permits a higher speed of operation of the machine. As has been explained above, the herein illustrated machine can be operated at a higher speed because of the action of the snubber in rendering substantially all of the gripper movement effective for applying a tensioning pull. Such high speed operation is also facilitated by the tendency of the friction device, which is associated with the gripper, to dampen out vibrations of the main shaft, carrying the three eccentrics, thus reducing wear and providing smoother operation at high speeds. The action of the snubber tends to steady the shoe, by clamping the stock against the shoe-bottom rest during those intervals when it is released by the gripper and, by preventing retrograde movement of the shoe, during such intervals, a definite intermittent feeding of the shoe by the gripper jaws is insured. Finally, the snubber holds the lasting margin of the stock up in a position to be readily engaged by the closing gripper jaws, a distinct advantage where the lasting margin of the stock is scant.

As has already been pointed out, the shoe-bottom rest 26 is provided with a flange 432 which extends laterally from the rib portion 430 and toward the plane of the side face of the wiper 24, see Figs. 3, 11 to 14. The front edge 434 of this flange is curved in an arc having its center approximately at the point $x$, denoting the axis of the shaft 44, so that it corresponds substantially with the path of movement of the closed gripper jaws. The outer edge 436 of this flange is parallel to the plane of the side face of the wiper and is located closely adjacent thereto. Hence, when the lasting margin of the tensioned stock is drawn inwardly from the edge of the shoe bottom, Fig. 13, it is, in effect, drawn in over this flange, or shield portion. Accordingly, premature adherence of the lasting margin of the stock with the sole member is prevented before engagement of the stock by the wiper. Inasmuch as such premature adherence of the lasting margin with the sole member might result in the formation of undesirable pleats in the lasting margin, which would not be removed by the wiper, the provision of the flange, or shield portion 432, on the shoe-bottom rest greatly improves the lasting action of the machine. In order that the shield portion 432 will be effective for this purpose, the shoe-bottom rest must be so adjusted, by means of the stop screw 426, that the edge 436 of the flange 432 is spaced from the plane of the side face of the wiper by a distance that is approximately two times the thickness of the stock being lasted. Now, when a lapped portion of the stock is encountered, the bottom rest may be forced yieldingly away from the wiper, against the action of the spring 422 to permit this portion of double thickness to pass through. By heating the shoe-bottom rest, in the manner explained above, adhesive on the bottom of the shoe being lasted will be rendered more slippery and the feeding of the shoe, by the gripper jaws, will be correspondingly facilitated. The shield portion of the shoe-bottom rest also protects the edge of the shoe-bottom member, for example, an insole or platform, from being distorted when the lasting margin of the tensioned stock is drawn inwardly over the shoe bottom by the gripper, thus insuring a well-defined feather line along the bottom of the shoe.

The lasting margin of the tensioned stock is wiped inwardly over, and pressed against, the bottom of the shoe being lasted by the action of the rotary wiper 24. As explained above, this wiper comprises a plurality of disks 25, 27 and 29 having on their periphery openings 31 and intervening lands 33, assembled together with these recesses and lands angularly offset. As will be seen in Fig. 15, with this arrangement, the openings 31 in the disk 25 provide a plurality of recesses in that side of the wiper which faces the gripper. Hence, as the tensioned stock is moved toward the wiper it will be received in these recesses and thus more readily engaged by the wiper. Also, the lands 33 on the three disks act successively on the lasting margin of the stock, like a plurality of hammers in groups of three, arranged as shown in Fig. 16, to apply a rapid series of pressure impulses, or hammer blows, to the stock so as to augment the adherence of the stock to the bottom of the shoe.

During each pulling action of the gripper, there is a tendency for the shoe to be lifted up and the stock beneath the wiper more firmly pressed against the operating surface of the wiper, thus increasing the pressure applied by the wiper. If desired, a disk wiper of the type disclosed and claimed in United States Letters Patent No. 2,455,694, issued December 7, 1948, in the name of L. G. Miller, and having an operating surface formed by a plurality of circumferentially disposed helical ribs for imparting hammer blows to the lasting margin of the stock, could be substituted for the disk wiper disclosed herein. As already pointed out, a shoe being lasted in the herein disclosed machine is so guided by the operator, against the edge guide roll 30, that a tangent to its edge, at the point of operation, (line $y$—$y$, Figs. 11–14) is inclined to the plane of the side face of the wiper. Accordingly, in addition to wiping the lasting margin of the stock inwardly from the edge of the shoe bottom, the wiper also has a small component of action in a direction lengthwise of the shoe. While this component of the action of the wiper alone is insufficient to effect movement of the shoe in the direction of feed, it nevertheless does have a definite tendency to facilitate the feeding of the shoe by means of the gripper jaws. Also, the wiper passes over the upper stock presented to it by the gripper jaws obliquely and with a minimum of resistance to movement of the shoe in the direction of feed.

Having described the invention, what is claimed as new and desired to secure by Letters Patent of the United States is:

1. A lasting machine having, in combination, a power-operated gripper for intermittently seizing, tensioning and releasing different portions of the stock to be lasted, successively, in different locations along the marginal edge of the bottom of a shoe, wiping means for laying the lasting margin of the tensioned stock inwardly over, and for pressing said lasting margin against, the bottom of the shoe, and means arranged to engage the lasting margin of the stock and operable, in time relation to the actions of the gripper, for holding the stock from loosening, in a succeeding location, each time the stock is released by said gripper.

2. A lasting machine having, in combination, a power-operated gripper for intermittently seizing, tensioning and releasing different portions of the stock to be lasted, successively, in different locations along the marginal edge of the bottom of a shoe, wiping means for laying the lasting margin of the tensioned stock inwardly over, and for pressing said lasting margin against, the bottom of the shoe, means for causing said gripper, while tensioning the stock, to exert a stress thereon tending to feed the shoe to present the lasting margin of the tensioned stock to said wiping means, and means arranged to engage the lasting margin of the stock and operable, in time relation to the actions of the gripper, for holding the stock from loosening, in a succeeding location, each time the stock is released by said gripper.

3. A lasting machine having, in combination, a power-operated gripper for intermittently seizing, tensioning and releasing different portions of the lasting margin of the stock to be lasted, successively, in different locations along the marginal edge of the bottom of a shoe, wiping means for laying the lasting margin of the tensioned stock inwardly over, and for pressing said lasting margin against, the bottom of the shoe, means for causing said gripper, while tensioning the stock, to exert stresses thereon tending to feed the shoe and draw the lasting margin of the stock inwardly over the bottom of the shoe to present said lasting margin to the wiping means, and means arranged to engage the lasting margin of the stock and operable, in time relation, to the actions of said gripper, to hold the stock from loosening, in a succeeding location, each time the stock is released by said gripper.

4. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, wiping means, spaced from said shoe-bottom-engaging member, for laying the lasting margin of the tensioned stock inwardly over, and for pressing said lasting margin against, the bottom of the shoe, and means, operating in time relation to the actions of the gripper, for clamping the lasting margin of the stock against a portion of the shoe-bottom-engaging member to hold the stock from loosening, in a succeeding location, each time the stock is released by said gripper.

5. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, wiping means, spaced from said shoe-bottom-engaging member, for laying the lasting margin of the tensioned stock inwardly over, and for pressing said lasting margin against, the bottom of the shoe, means for causing said gripper, while tensioning the stock, to exert a stress thereon tending to feed the shoe to present the lasting margin of the tensioned stock to said wiping means, and means, operating in time relation to the actions of the gripper, for clamping the lasting margin of the stock against a portion of the shoe-bottom-engaging member to hold the stock from loosening, in a succeeding location, each time the stock is released by said gripper.

6. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, wiping means, spaced from said shoe-bottom-engaging member, for laying the lasting margin of the tensioned stock inwardly over, and for pressing said lasting margin against, the bottom of the shoe, means for causing said gripper, while tensioning the stock, to exert stresses thereon tending to feed the shoe and draw the lasting margin of the stock inwardly over the bottom of the shoe to present said lasting margin to the wiping means, and means, operating in time relation to the actions of the gripper, for clamping the lasting margin of the stock against a portion of the shoe-bottom-engaging member to hold the stock from loosening, in a succeeding location, each time the stock is released by said gripper.

7. A lasting machine having, in combination, a power-operated gripper for intermittently seizing, tensioning and releasing different portions of the lasting margin of the stock to be lasted, successively, in different locations along the marginal edge of the bottom of a shoe, a continuously acting rotary wiper for laying the lasting margin of the tensioned stock inwardly over, and for pressing said lasting margin against, the bottom of the shoe, and means arranged to engage the lasting margin of the stock and operable in time relation to the action of the gripper for holding the stock from loosening, in a succeeding location, each time the stock is released by said gripper.

8. A lasting machine having, in combination, a power-operated gripper for intermittently seizing, tensioning and releasing different portions of the lasting margin of the stock to be lasted, successively, in different locations along the marginal edge of the bottom of a shoe, a continuously acting rotary wiper for laying the lasting margin of the tensioned stock inwardly over, and for pressing said lasting margin against, the bottom of the shoe, means for causing said gripper, while tensioning the stock, to exert a stress thereon tending to feed the shoe to present the lasting margin of the tensioned stock to said wiping means, and means arranged to engage the lasting margin of the stock and operable, in time relation to the action of the gripper, for holding the stock from loosening, in a succeeding location, each time the stock is released by said gripper.

9. A lasting machine having, in combination, a power-operated gripper for intermittently seizing, tensioning and releasing different portions of the lasting margin of the stock to be lasted, successively, in different locations along the marginal edge of the bottom of a shoe, a continuously acting rotary wiper for laying the lasting margin of the tensioned stock inwardly over, and for pressing said lasting margin against, the bottom of the shoe, means for causing said gripper, while tensioning the stock, to exert stresses thereon tending to feed the shoe and draw the lasting margin of the stock inwardly over the bottom of the shoe to present said lasting margin to the wiping means, and means arranged to engage the lasting margin of the stock and operable, in time relation to the action of the gripper, for holding the stock from loosening, in a succeeding location, each time the stock is released by said gripper.

10. A lasting machine having, in combination, a member for engaging the bottom of a shoe adjacent to the marginal edge thereof, a power-operated gripper for intermittently seizing, tensioning and releasing different portions of the stock to be lasted, succesively, in different locations along the marginal edge of the bottom of the shoe, a continuously acting rotary wiper for laying the lasting margin of the tensioned stock inwardly over, and for pressing said lasting margin against, the bottom of the shoe, and means, operating in time relation to the action of the gripper, for clamping the lasting margin of the stock against a portion of the shoe-bottom-engaging member to hold the stock from loosening, in a succeeding location, each time the stock is released by said gripper.

11. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, a continuously acting rotary wiper for laying the lasting margin of the tensioned stock inwardly over, and for pressing said lasting margin against, the bottom of the shoe, means for causing said gripper, while tensioning the stock, to exert a stress thereon tending to feed the shoe to present the lasting margin of the tensioned stock to said wiping means, and means, operating in time relation to the action of the gripper, for clamping the lasting margin of the stock against a portion of the shoe-bottom-engaging member to hold the stock from loosening, in a succeeding location, each time the stock is released by said gripper.

12. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, a continuously acting rotary wiper for laying the lasting margin of the tensioned stock inwardly over, and for pressing said lasting margin against, the bottom of the shoe, means for causing said gripper, while tensioning the stock, to exert stresses thereon tending to feed the shoe and draw the lasting margin of the stock inwardly over the bottom of the shoe to present said lasting margin to the wiping means, and means, operating in time relation to the action of the gripper, for clamping the lasting margin of the stock against a portion of the shoe-bottom-engaging member to hold the stock from loosening, in a succeeding location, each time the stock is released by said gripper.

13. A lasting machine having, in combination, a gripper including a pair of jaws, power-operated means for intermittently closing said jaws on the stock to be lasted, then moving them in a heightwise direction, relatively to the bottom of a shoe, to tension the stock, and finally opening the jaws to release the stock and returning them to their original positions, thereby to tension different portions of the stock, successively, in different locations along the marginal edge of the bottom of the shoe, means including a member movable by the operator to start operation of the gripper, and mechanism associated with the movable member for controlling the action of the power-operated means to vary the extent of heightwise movement of the gripper jaws after they have been closed on the stock, by additional movements of said member.

14. A lasting machine having, in combination, a gripper including a pair of jaws, power-operated means for intermittently closing said jaws on the stock to be lasted, then moving them in a heightwise direction, relatively to the bottom of a shoe, to tension the stock, and finally opening the jaws to release the stock and returning them to their original positions, thereby to tension different portions of the stock, successively, in different locations along the marginal edge of the bottom of the shoe, wiping means for laying the lasting margin of the tensioned stock inwardly over, and for pressing said lasting margin against the bottom of the shoe, means including a member movable by the operator to start operation of the gripper, and mechanism associated with the movable member for controlling the action of the power-operated means to vary the extent of heightwise movement of the gripper jaws, after they have been closed on the stock, by additional movements of said member.

15. A lasting machine having, in combination, a gripper including a pair of jaws, power-operated means for intermittently closing said jaws on the stock to be lasted, then moving them in a heightwise direction, relatively to the bottom of a shoe, to tension the stock, and finally opening the jaws to release the stock and returning them to their original positions, thereby to tension different portions of the stock, successively, in different locations along the marginal edge of the bottom of the shoe, a treadle movable by the operator to start the operation of the gripper, and mechanism associated with the treadle for controlling the action of the power-operated means to vary the extent of heightwise movement of the gripper jaws, after they have been closed on the stock, by additional movements of said treadle.

16. A lasting machine having, in combination, a gripper including a pair of jaws, power-operated means for intermittently closing said jaws on the stock to be lasted, then moving them in a heightwise direction, relatively to the bottom of a shoe, to tension the stock, and finally opening the jaws to release the stock and returning them to their original positions, thereby to tension different portions of the stock, successively, in different locations along the marginal edge of the bottom of the shoe, wiping means for laying the lasting margin of the tensioned stock inwardly over, and for pressing said lasting margin against, the bottom of the shoe, a treadle movable by the operator to start operation of the gripper, and mechanism associated with the treadle for controlling the action of the power-operated means to vary the extent of heightwise movement of the gripper jaws, after they have been closed on the stock, by additional movements of said treadle.

17. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, a member, operating in time relation to the action of said gripping means, for clamping the lasting margin of the stock against a portion of said shoe-bottom-engaging member to hold the stock from loosening, in a succeeding location, each time the stock is released by the gripper, a member movable by an operator to start the operation of said gripper, and mechanism associated with said movable member for starting the operation of said clamping member when said gripper is set in operation.

18. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal edge of the bottom of the shoe, a member, operating in time relation to the action of said gripper, for clamping the lasting margin of the stock against a portion of said shoe-bottom-engaging member to hold the stock from loosening, in a succeeding location, each time the stock is released by the gripper, means for holding said clamping member away from said shoe-bottom-engaging member, a member movable by an operator to start the operation of said gripper, and mechanism associated with said movable member for releasing said clamping member to start it operating when said gripper is set in operation.

19. A lasting machine having, in combination, a member for engaging the bottom of a shoe adjacent to the marginal edge thereof, a power-operated gripper for intermittently seizing, tensioning and releasing portions of the stock to be lasted, successively, in different locations along the marginal edge of the bottom of the shoe, a guide member for engaging the side of the shoe to position it with relation to the gripper, a member, operable in time relation to the action of said gripper, for clamping the lasting margin of the stock against a portion of the shoe-bottom-engaging member to hold the stock from loosening, in a succeeding location, each time the stock is released by the gripper, a member movable by an operator, in one direction, to start the operation of the gripping means and clamping member, and movable, in the opposite direction, to stop the operation of the gripping means and the clamping member, and mechanism associated with said movable member for projecting said guide member to operative position, when said movable member is moved in said first-mentioned direction by the operator, and for retracting said guide member to an inoperative position, when said movable member is automatically moved in said opposite direction.

20. A lasting machine having, in combination, a relatively fixed member for engaging the bottom of a shoe adjacent to the marginal edge thereof, a power-operated gripper for intermittently seizing, tensioning and releasing different portions of the stock to be lasted, successively, in different locations along the marginal portion of the bottom of the shoe, wiping means for laying the lasting margin of the tensioned stock inwardly over, and for pressing said lasting margin against the bottom of the shoe, said gripper also being operable, while tensioning the stock, to exert stresses thereon tending to feed the shoe and to draw the lasting margin of the stock inwardly over the bottom of the shoe, said shoe-bottom-engaging member being provided with a portion extending in a direction toward said wiper for preventing contact of the lasting margin with the bottom of the shoe prior to engagement by said wiper.

21. A lasting machine having, in combination, a member for engaging the bottom of a shoe adjacent to the marginal edge thereof, a power-operated gripper for intermittently seizing, tensioning and releasing different portions of the stock to be lasted, successively, in different locations along the marginal portion of the bottom of the shoe, a continuously acting rotary wiper for laying the lasting margin of the tensioned stock inwardly over, and for pressing said lasting margin against the bottom of the shoe, said gripper also being operable, while tensioning the stock, to exert stresses thereon tending to feed the shoe and to draw the lasting margin of the stock inwardly over the bottom of the shoe, and said shoe-bottom-engaging member being provided with a portion extending in a direction toward said wiper for preventing contact of the lasting margin with the bottom of the shoe prior to engagement by said wiper.

LLOYD G. MILLER.

References Cited in the file of this patent

UNITED STATES PATENTS

| Number | Name | Date |
| --- | --- | --- |
| 456,225 | Sinning | July 21, 1891 |
| 472,599 | Avery | Apr. 12, 1892 |
| 2,327,392 | Baker | Aug. 24, 1943 |
| 2,463,017 | Brostrom | Mar. 1, 1949 |